Nov. 24, 1942.                    C. G. OLSON                    2,303,226
        WASHER FEED MECHANISM FOR SCREW AND WASHER ASSEMBLY MACHINES
                    Original Filed July 8, 1939      5 Sheets-Sheet 1
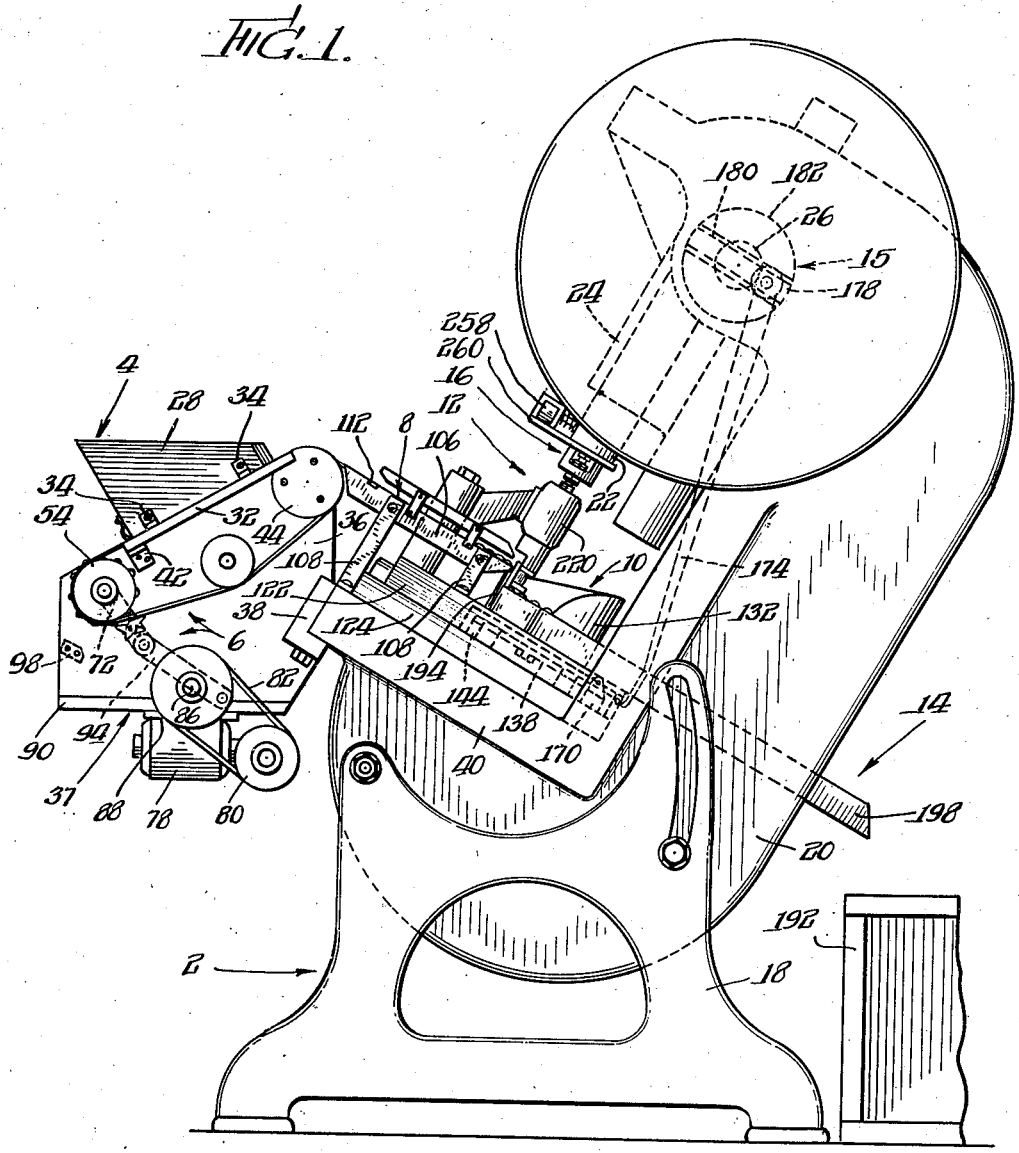
INVENTOR.
Carl G. Olson
BY Cox Moore & Olson
attys Nov. 24, 1942.  C. G. OLSON  2,303,226
WASHER FEED MECHANISM FOR SCREW AND WASHER ASSEMBLY MACHINES
Original Filed July 8, 1939  5 Sheets-Sheet 2
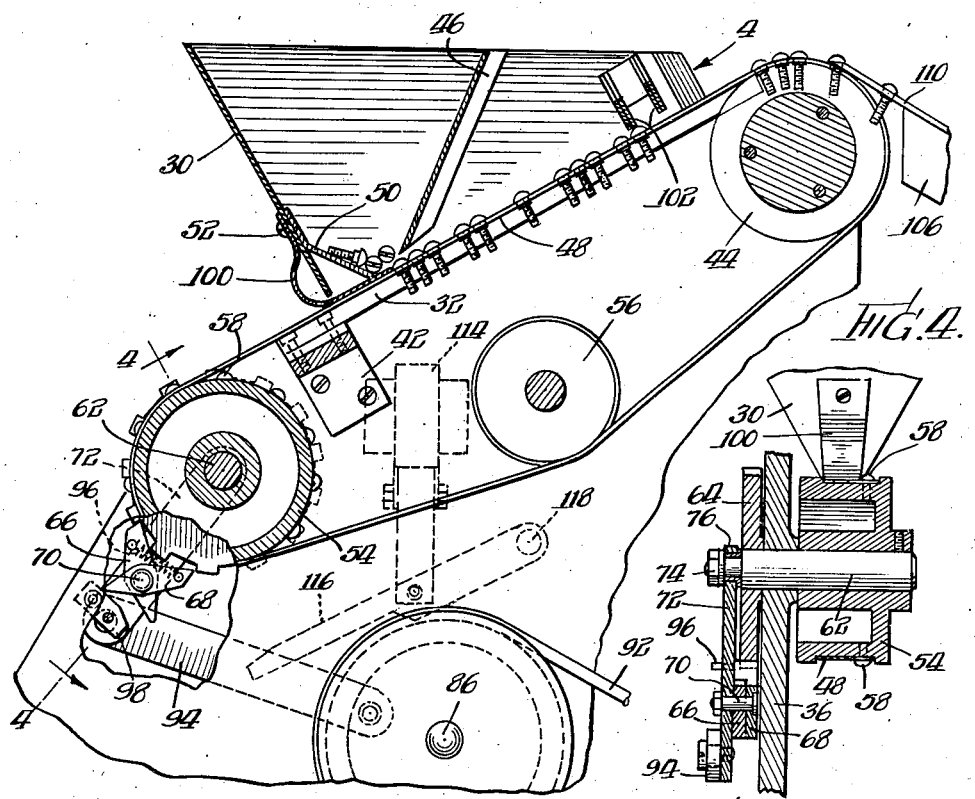

Nov. 24, 1942.  C. G. OLSON  2,303,226
WASHER FEED MECHANISM FOR SCREW AND WASHER ASSEMBLY MACHINES
Original Filed July 8, 1939  5 Sheets-Sheet 3
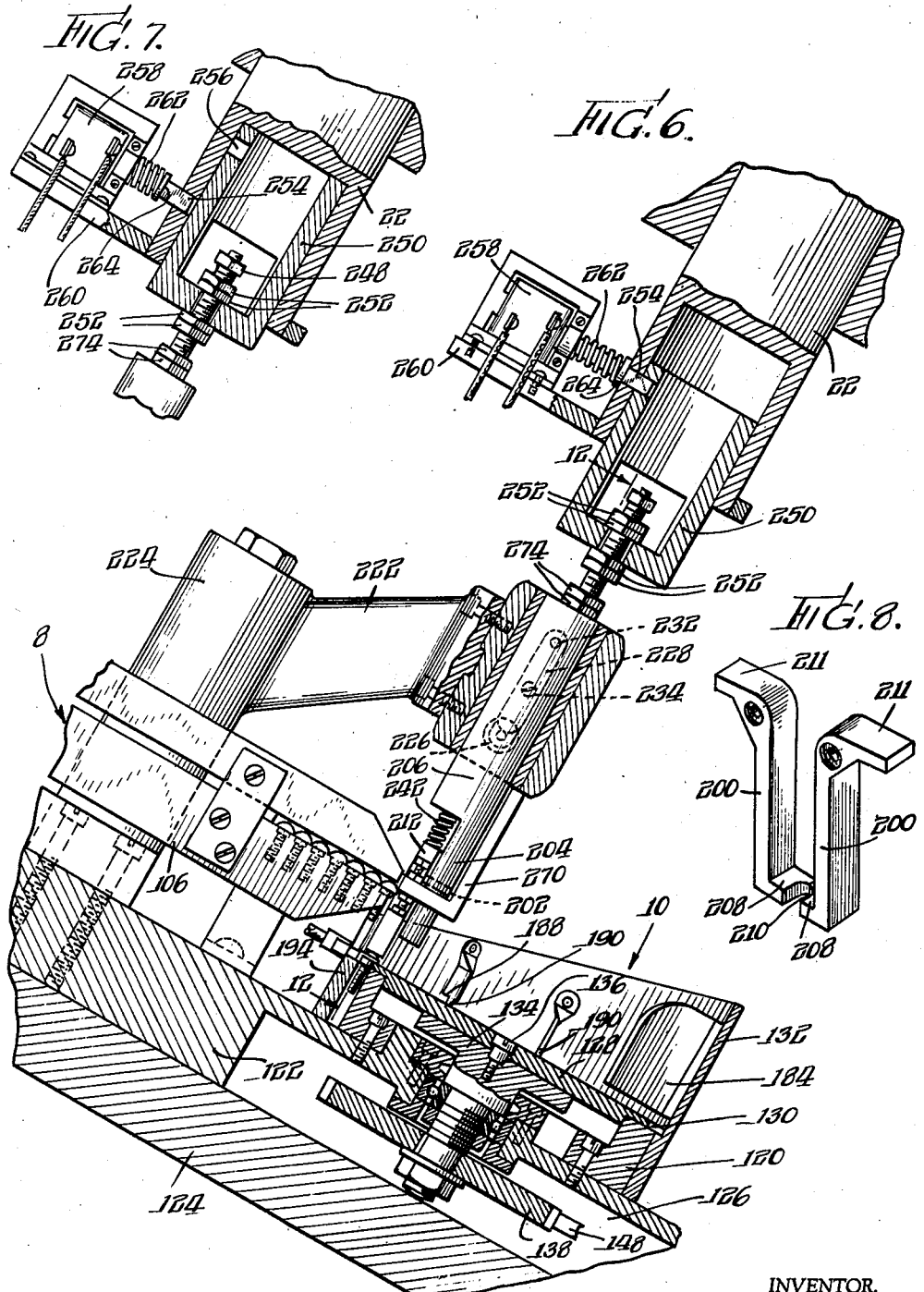
INVENTOR.
Carl G. Olson
BY: Cox Moore & Olson
attys.

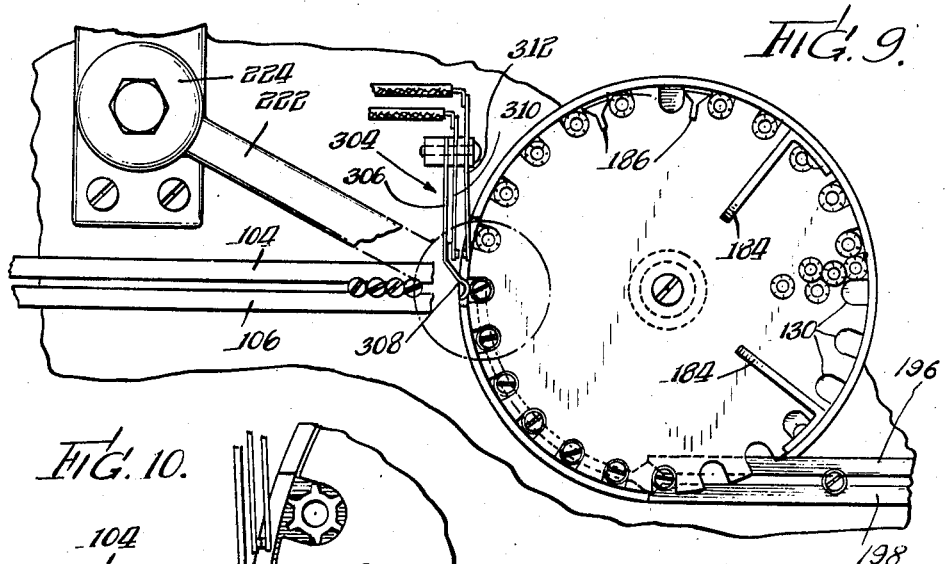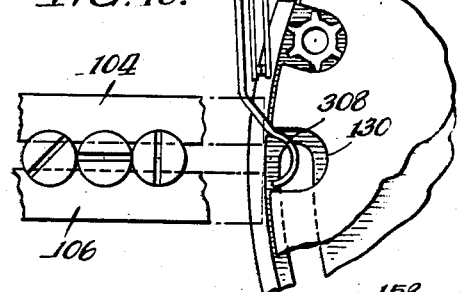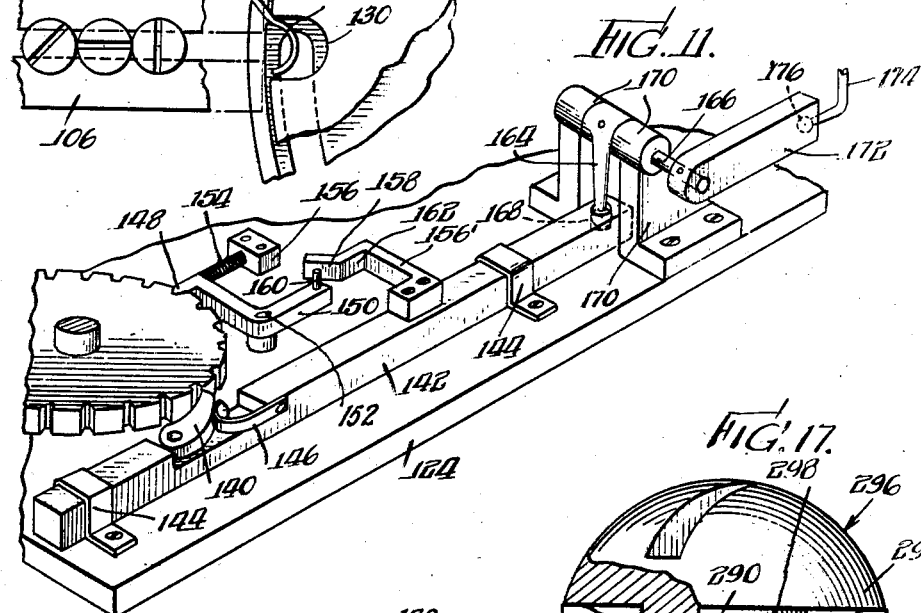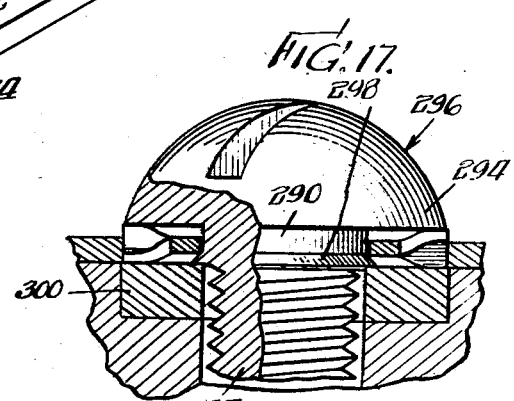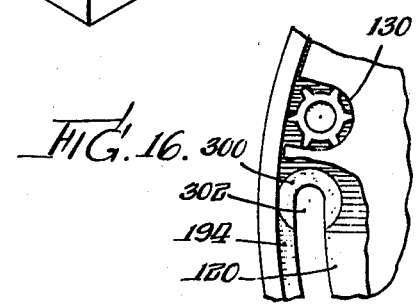

Nov. 24, 1942.   C. G. OLSON   2,303,226
WASHER FEED MECHANISM FOR SCREW AND WASHER ASSEMBLY MACHINES
Original Filed July 8, 1939   5 Sheets-Sheet 5
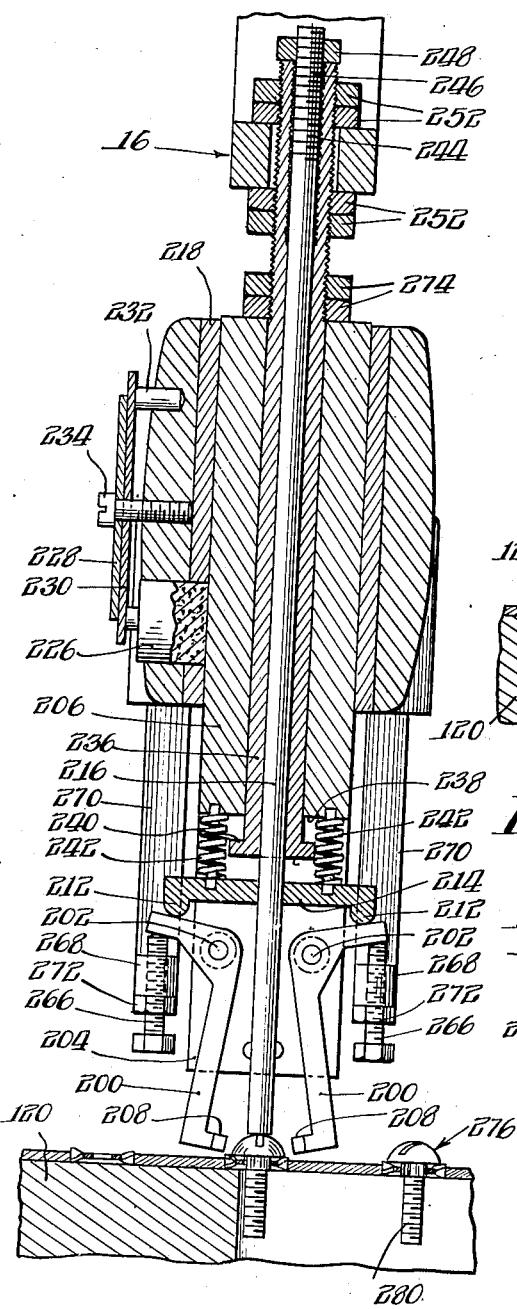
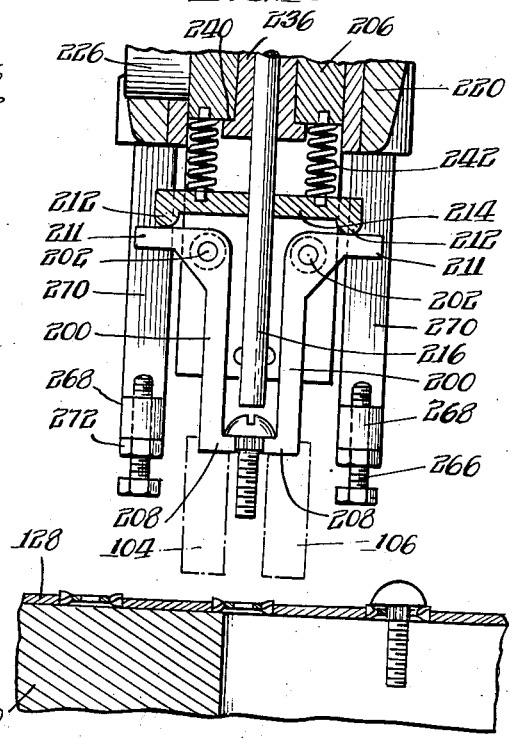
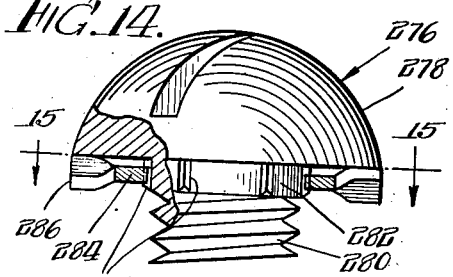
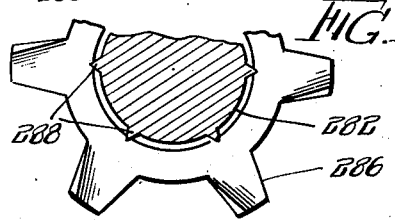
INVENTOR.
Carl G. Olson
BY Cox, Moore & Olson
attys Patented Nov. 24, 1942

2,303,226

UNITED STATES PATENT OFFICE 2,303,226

WASHER FEED MECHANISM FOR SCREW AND WASHER ASSEMBLY MACHINES

Carl G. Olson, Chicago, Ill., assignor to Illinois Tool Works, Chicago, Ill., a corporation of Illinois Original application July 8, 1939, Serial No. 283,373. Divided and this application July 21, 1941, Serial No. 403,416

6 Claims. (Cl. 10—169)

This invention relates to a washer feed mechanism for a machine or mechanism for assembling screw and washer elements, and more particularly to that type of machine or assembling mechanism which assembles washers with threaded screw elements which have an enlarged portion beneath the head of the screw and with which enlarged portion the washer is frictionally associated or on which it is retained by a swedging of the screw or washer.

The present application is a division of my co-pending application, Serial No. 283,373, filed July 8, 1939, for a Screw and washer assembling machine.

It is an object of this invention to provide simplified washer and screw feeding means and assembly mechanism cooperating with such feeding means to telescope the screws and washers.

Applicant's invention has as another object the provision in a machine or mechanism of the above stated character a washer conveyor which conveys the washers to the assembly point or remains operative after the washers have been assembled with screws to convey the assembled units away from the point of assembly.

A further object of the invention is to provide in a screw and washer assembly mechanism or machine a washer feeding rotary member directly receiving washers from a washer hopper conveying them to a point at which screws are assembled therewith and then in the continued movement of the rotary member conveying the assembled units away from this point.

Other and further objects and advantages of the invention will be apparent from the following description when taken in connection with the accompanying drawings wherein:

Fig. 1 is a view in elevation of a machine embodying the invention.

Fig. 2 is a fragmentary view in elevation and partly in longitudinal section through the screw conveyor and hopper.

Fig. 3 is a plan view of the mechanism shown in Fig. 2.

Fig. 4 is a fragmentary vertical section taken along the line 4—4 of Fig. 2.

Fig. 5 is a fragmentary vertical section taken along the line 5—5 of Fig. 3.

Fig. 6 is a fragmentary view in vertical elevation partly in section, through the washer feed means and the assembly mechanism.

Fig. 7 is a fragmentary view partly in section showing the positions of certain parts of the assembly mechanism if no washer is present at the point of assembly.

Fig. 8 is a perspective view of the screw receiving and conveying jaws of the assembly mechanism.

Fig. 9 is a fragmentary plan view of the washer conveyor, a portion of the assembly mechanism, the washer sensing means, the screw conveyor, the screw chute and the guide chute for the assembled units.

Fig. 10 is a fragmentary plan view with certain elements broken away for illustrating the operation of the washer conveyor and the washer sensing means.

Fig. 11 is a fragmentary view in perspective illustrating the driving mechanism for the washer feed means.

Fig. 12 is an enlarged vertical section taken substantially along the line 12—12 of Fig. 6.

Fig. 13 is a view in vertical section of a portion of the mechanism shown in Fig. 12, but with the parts in a different position of operation.

Fig. 14 is a fragmentary enlarged view illustrating one form of an assembly unit produced by the machine of this invention.

Fig. 15 is a fragmentary view in horizontal section taken along the line 15—15 of Fig. 14.

Fig. 16 is a fragmentary plan view of the washer conveyor provided with means for upsetting the metal of the screw elements.

Fig. 17 is an enlarged fragmentary view partly in section and partly broken away for illustrating a second form of assembled screw and washer unit and showing how the metal of the screw element is upset by the means shown in Fig. 16.

As shown in the drawings, the machine which forms one embodiment of the present invention comprises a punch press machine 2 of standard or well-known type for which are provided additional mechanisms or attachments by which said machine may be adapted for the production of permanently assembled screw and washer units. These additional mechanisms comprise a hopper 4 for receiving a mass of screws; a screw feed mechanism 6 for conveying the screws from the hopper 4 onto an inclined guide or feeding chute 8, a washer hopper and washer feed mechanism 10, an assembly mechanism 12, a conveyor or guide chute 14 for discharging the assembled screw and washer units, a drive attachment 15 for the washer feed mechanism, and a drive attachment 16 for the assembly mechanism 12.

The punch press machine comprises a main base or pedestal 18; an auxiliary base or body 20 angularly adjustable on the base 18; a press or ram 22 vertically reciprocable in a guide 24 and power actuated from a crank shaft 26 through a suitable crank not shown.

*The hopper and feed mechanism for the screws*

As shown in Figs. 1 to 5, the hopper 4 and feed mechanism 6 for the screws comprise a hopper casting having forwardly and downwardly converging side walls 28 and inclined rear wall 30, the hopper being mounted on inclined laterally spaced bars 32 by brackets 34 secured to the side walls 28 and to the bars 32. The bars 32 are in turn mounted upon the upstanding web 36 of a mounting casting 37 having an L-shaped laterally extending flange portion 38 adapted to be bolted or otherwise secured to the bed plate 40 of the punch press 2 at its forward edge. The bars 32 are mounted at their lower ends on a bracket 42 secured to the web 36 and at their upper ends are received within a cut-away rim portion of the disc or discs 44 pinned or bolted to the web 36.

The hopper is provided with a baffle wall or plate 46 inclined oppositely to the rear wall 30 and extending between the side walls 28, the rear wall 30 and the baffle plate 46 terminating at their lower edges somewhat above the surface of the bars 32. It is to be noted that the walls 28 and 30 and the baffle plate 46 converge at the bottom and central portion of the hopper so that the screws of the mass within the chamber formed by these walls and the baffle plate readily move by gravity to the bottom opening between the side walls. The bottom opening of the hopper is closed by an endless, preferably metallic, band 48 which moves along the upper surface of the bars 32. A resilient plate 50 secured to the rear wall 30 of the hopper as by the screw 52 extends forwardly of the rear wall toward the baffle plate 46 to provide a resilient wall section at the mouth of the opening preventing jamming of the screws between the walls of the hopper and between the hopper walls and the tape 48 or the bars 32.

The endless band 48 is received in an annular groove or track of a drive pulley or sprocket 54 and in an annular groove or track of the fixed disc or discs 44. The endless band in its lower flight passes over idler pulley 56 rotatably mounted on the web 36 between the pulley or sprocket 54 and the disc or discs 44. The drive pulley or sprocket 54 is preferably provided with a plurality of angularly spaced protuberances or sprocket teeth 58 receivable within longitudinally spaced circular apertures in the endless band 48, whereby the band 48 is driven by the wheel 54. The band 48 is additionally provided with a plurality of longitudinally spaced relatively elongated apertures or openings 60 to receive the screws from the hopper 4. The openings 60 are each of a width very slightly greater than the diameter of the shank of the particular size screws to be fed. To accommodate screws of different sizes, bands 48 having openings 60 of different widths will be provided. In order to permit ready substitution of one band for another, the pulley or sprocket 54 and the disc 44 may be made in detachable sections and the idler pulley 56 adjustably mounted so as to be disengaged from the band during removal or replacement thereof. The openings 60 are relatively elongated so that each opening accommodates several screws and so as to receive a screw which although positioned in transverse alignment with the opening, may be tilted at a vertical angle with respect to the surface of the band 48.

The pulley or sprocket wheel 54 is fixed to a shaft 62 journalled in the web 36 and extending therethrough. The shaft 62 is driven by a ratchet wheel 64 secured to the shaft 62, the ratchet in turn being intermittently driven by a pair of pawls 66 and 68 carried by and journalled on a pivot pin 70 secured at an intermediate point to a lever 72 journalled on the shaft 62 and held against axial movement by the nut 74 and a shoulder formed on the bushing 76. The lever 72 and the pawls 66 and 68 are continuously driven or oscillated by an electric motor or other suitable prime mover 78 secured to the casting 37 and geared to a drive pulley 80 which through a belt 82 drives a pulley 84. The pulley 84 is secured to one end of a shaft 86 journalled in the web 36 of the casting 37 and a bracket 88 mounted on the lower lateral flange 90 of the casting 37. A disc or crank 92 is secured to the other end of the shaft 86 and is connected to the lever 72 by a link or pitman 94 pivotally associated with the free end of the lever 72 and with the crank or disc 92.

A spring 96 connects the pawls 66 and 68 and urges them into engagement with the ratchet 64. A cam plate 98 fixed to the web 36 controls the pawl 68, which pawl causes the ratchet to rotate backwardly during a certain portion of its cycle of operation. This reverse motion of the ratchet and the consequent reverse movement of the band 48 cause the screws more readily to position themselves in the openings 60 in the band 48. Upon this reverse movement of the band 48, the screws at the bottom of the hopper and those partially positioned in the openings 60 of the band 48 might tend to jam in the hopper or jam between the hopper and the band so as to crush the screws or damage the band, and to prevent this, a resilient member 100 is provided and is secured to the hopper by the screw 52. The outer free end portion of the member 100 rests flatwise against the surface of the band as shown in Fig. 2 and extends forwardly beyond the resilient plate 50. The member 100 yields rearwardly upon reverse movement of the band and by engagement with the lowermost screws in the hopper and the screws on the band applies thereto a force which prevents the jamming of the screws upon the reverse movement of the band.

Stripper springs 102 each of generally U-shaped configuration in horizontal section are secured to the side walls 28 of the hopper adjacent its forward end and have their lower extremities overlapped in alignment with the openings 60 in the band 48 and are so elevated above the band as to clear the heads of screws which are properly positioned in the openings in the band, but to engage screws which are improperly positioned in the band or are carried upon the surface of the band so that such improperly positioned screws are dislodged from the surface of the band and caused to return toward the plate 46 of the hopper or are shifted relative to the band into proper position relative thereto.

The inclined guide or feeding chute 8 comprises a pair of bars 104 and 106 spaced apart a distance somewhat greater than the maximum diameter of the screw shank, but somewhat less than the diameter of the screw head so that the screws will slide by gravity along these bars. The bars 104 and 106 are mounted upon supporting brackets 108 for adjustment relative to each other to accommodate different sizes of screws, and the brackets 108 are in turn secured to the bed plate 40 of the punch press and the supporting base for the washer hopper and feed mechanism 10 and the assembly mechanism 12. A pair of resilient strips or fingers 110 secured to the upper ends of the bars 104 and 106 extend therefrom to the disc or discs 44 and at their free ends press against the surface of the band at a point where the band curves downwardly so as to engage beneath the head of a screw as it reaches this point. The weight of the suspended shank of each screw tends to cause the screw to assume a vertical position wherefore the forward edge of the head of each screw is spaced slightly from the surface of the band at the point where the fingers 110 engage the band and consequently the screws are removed from the band and slide between the fingers onto the bars 104 and 106.

The operation of the screw feeding mechanism 6 is as follows:

As the disc 92 rotates in a clockwise direction, the pitman 94 moves from the position shown in Fig. 1 to the position shown in Fig. 2, the leading edge of the pawl 66 engages the tooth of the ratchet 64 and causes the ratchet to revolve in a clockwise direction, this movement of the ratchet causing, through the sprocket 54, the band 48 to advance screws toward the guide chute 8. As the pitman approaches the end of a stroke in this direction, the free end of the pawl 68 engages the cam 98. The angular face of the cam causes the pawl 68 to revolve slightly and disengage the ratchet 64. As the pitman continues to the end of its stroke and starts to return, the cam 98 keeps the pawl 68 out of engagement with the ratchet until the toothed edge of the pawl, which formerly rested between two adjacent teeth of the ratchet, clears the forward face of the following tooth of the ratchet, and as the pitman continues its return, the pawl 68 rests upon the periphery of the ratchet and finally slides into the succeeding groove between the next adjacent pair of ratchet teeth somewhat before the pitman has completed its return movement. As the pitman completes this return movement, the pawl 68 causes the ratchet to rotate in a counter-clockwise direction and the band 48 therefore to move toward the left in Fig. 2. This movement of the band to the left serves to agitate the mass of screw blanks in the hopper and, with the resilient members 50, 100, and 102, facilitates the feeding of the screws into the apertures 60 in the band 48 and their proper positioning therein. The pitman 94 having completed its movement to the right, now begins its movement to the left, during all of which movement the pawl 66 engages the next ratchet tooth and moves the ratchet counter-clockwise in an arc equal, for example, to one and one-third ratchet teeth, the pawl 68 on the other hand moving the ratchet rearwardly during its effective engagement therewith a distance equal, for example, to two-thirds of a ratchet tooth. It will therefore be apparent that the band 48 moves intermittently first in a direction to the right as seen in Fig. 2, and then in a direction to the left, but the movement to the right is substantially greater than the movement to the left so that the band therefore with an interrupted motion feeds the screws from the hopper 4 to the guiding and feeding chute 8.

In order to prevent operation of the feeding mechanism 6 when the guiding and feeding chute 8 contains a full complement of screws, the guide bars 104 and 106 are provided with contact members 112 insulated therefrom and electrically connected to a power source not shown and to a solenoid 114. The solenoid 114 through its armature controls a lever 116 pivoted as at 118 to the web 36. When by reason of the energization of the solenoid 114, the lever 116 is moved in a clockwise direction as seen in Fig. 2, it is positioned to engage the free end of the pawl 66 as the pitman approaches its limit of movement to the right and as the pitman then moves to the left, retains the pawl 66 out of engagement with the ratchet until the tooth end of the pawl has cleared the next tooth of the ratchet so that the pawl 66 moves freely about the periphery of the ratchet. The pawl 66, having moved freely over the ratchet in a clockwise direction, the pawl 68 upon the following movement of the pitman to the right, also moves idly over the periphery of the ratchet. When by reason of the operation of the assembly mechanism 12, screws are withdrawn from the guiding and feeding chute 8, the screw which completed the electrical connection between the plates 112 passes downwardly from these plates and the circuit to the solenoid 114 is thereupon broken. The lever 116 by reason of its own weight and the weight of the armature of the solenoid, moves in a counter-clockwise direction out of the path of movement of the pawl 66. Hence upon the next movement of the pitman 94 to the left, the pawl 66 effects a feeding movement of the band 48.

*The washer hopper and washer feed mechanism*

The washer hopper and washer feed mechanism comprises as best shown in Figs. 1 and 6 and 9 to 11 a ring 120 bolted or otherwise secured to a base plate 122 in turn mounted on or formed with a plate 124 secured to the bed plate 40 of the punch press 2. The plate 122 is cut away at its rear portion to form a housing chamber 126 for a portion of the driving mechanism of the washer feed mechanism. The ring 120 forms a guide and bearing for a rotary washer feed plate or disc 128 which is provided with a plurality of angularly spaced outwardly opening peripheral recesses or notches 130 to receive the washers. The disc at its periphery is of a thickness not substantially greater than the thickness of the washers to be handled.

The disc 128 forms one wall of a washer hopper of which the remaining wall is formed by an annular shell or plate 132 secured to the ring 120 and extending circumferentially of the ring through an arcuate distance somewhat less than 270 degrees. The disc 128 is fastened to the upper end of a shaft 134 as by a screw 136, the shaft 134 passing into the chamber 126 and having secured to its lower end a feed ratchet and index plate 138.

The plate 138 is rotated in a counterclockwise direction by a pawl 140 pivoted to a slide bar 142 slidably mounted in guides 144 secured to the plate 124. A spring strip 146 yieldably urges the pawl 140 into engagement with the teeth of the ratchet plate 138.

An indexing finger 148 is carried by a bell crank 150 pivoted as at 152 to the plate 124 within the chamber 126. The index finger 148 is urged toward the ratchet plate into engagement therewith by a spring 154 interposed between one arm of the bell crank and a block 156 fixed to the plate 124 or the plate 122. The bell crank 150 is rotated in a clockwise direction to release the index finger 148 from the ratchet during its operation by the pawl 140, by means of a cam bar 156' secured to the slide bar 142 and having an angular cam face 158 adapted to engage a pin 160 secured to one arm of the bell crank. In the rear of the angular cam face 158, the bar 156' is provided with a portion 162 extending parallel to the path of movement of the bar 142 so that during movement of the pin 160 across the portion 162, the index finger 148 is held in released position.

A crank 164 secured to a stud shaft 166 drives the slide bar 142 through a ball and socket joint 168. The shaft 166 is journalled in brackets 170 fixed to the plate 124 and to the shaft there is secured at its outward end a crank 172. A connecting rod 174 is connected to the crank 172 by a ball and socket joint 176 and the connecting rod 174 is driven by the crank shaft 26 of the punch press machine, the connecting rod being pivoted to a block 178 adjustably mounted in a slot 180 extending diametrically of a disc 182 secured to the crank shaft 26.

A pair of radial baffles 184 secured to the hopper shell 132 at angularly spaced points are spaced at their lower edges slightly above the disc 128 to assure placement of washers in the recesses 130 and to retain the mass of washers against rotation with the disc 128.

Short radial baffles 186 of resilient material are also secured to the hopper shell 132 at angularly spaced points and each provides a lower edge 188 spaced from the upper surface of the disc 128 a distance slightly greater than the thickness of a washer and a depending finger 190 extending almost to the surface of the disc, but spaced from the circumference of the disc a distance slightly less than the diameter of a washer. The finger 190 is therefore positioned to engage the external teeth of a lock washer which may have become interlocked with a washer in one of the recesses 130 and be fed by the disc in superimposed position in respect to the washer in the recess. The finger 190 in engaging the external teeth of this superimposed washer applies thereto, as the disc 128 is rotated, a force tending to rotate the superimposed washer to release the washers from each other so that only one washer will be fed at a time to the point of assembly.

The disc 128 not only feeds washers to the point of assembly, but also feeds the assembled units from the point of assembly to the guide chute 14, which discharges the assembled units from the machine into a suitable receptacle such as shown at 192 in Fig. 1. For this purpose the ring 120 is circumferentially recessed through an arc of substantially 90 degrees to form one wall of a guide for the shanks of the screws as the assembled units are fed from the point of assembly to the feed chute 14. The other wall of this guide is formed by an arcuate bar 194 adjustably secured in any convenient manner to the surface of the plate 122 or to the circumference of the ring 120.

The chute 14 preferably comprises a pair of spaced inclined bars 196 and 198 adjustably secured to the plate 122 to provide a screw receiving channel extending substantially tangentially to the disc 128 and extending from this disc rearwardly of the machine between the upstanding legs of the auxiliary base or body 20 of the punch press.

The chute 8 which supplies the screws to the assembly means 12 feeds the screws along a path lying in a plane extending radially with respect to the washer feed disc 128 and as will presently appear, the assembly means selects the foremost screw at the lower end of the chute 8 and inserts it into a washer positioned in a recess 130 that at the moment lies in this radial plane and the washer feed plate then feeds the assembled screw and washer unit along the guide chute formed by the arcuate bar 194 and the circumferentially recessed portion of the ring 120 to the chute 14 and between the bars 196 and 198 forming this chute. As the disc continues to rotate, the inner surface of the bar 196 engages the shank of the screw and thereby extracts the assembled unit from the disc.

The operation of the washer feed mechanism is substantially as follows: As the crank shaft 26 in the punch press rotates, the connecting rod 174 moves up and down and through the crank 172 causes the shaft 166 to oscillate. Upon oscillation, the shaft 166 causes the bar 142 to move forwardly and then backwardly. The bar 142 in moving forwardly carries the cam bar 156' into engagement with the pin 160 carried by the bell crank 150 and the angular cam face 158 causes the bell crank to rotate clockwise as seen in Fig. 11, thereby to remove the index finger 148 from the ratchet or index plate 138. As the bar 142 continues to move, the parallel portion 162 of the cam bar engages the pin 160 and retains the bell crank in its clockwise limit of movement. As the bar 142 moves rearwardly, the pawl 140 engages the ratchet 138 and causes this ratchet to rotate through a given angular distance in a counterclockwise direction as seen in Fig. 11, thereby causing the washer feed disc 128 also to move in a counterclockwise direction to position the next succeeding washer at the assembly point. During this rearward movement of the bar 142, the parallel portion 162 leaves the pin 160 which then engages the angular face 158, but the index finger 148 is not then moved into engagement with a groove between the ratchet teeth at the plate 138, but rides upon the periphery of one of these ratchet teeth until when the plate 138 has moved the desired angular distance, the index finger 148 is aligned with such a groove and the spring 154 thereupon snaps this index finger thereinto to prevent overfeeding of the ratchet and the disc and to insure that the washers are positioned precisely at the point of assembly.

*The assembly mechanism*

The assembly mechanism as best shown in Figs. 1, 6 to 9, 12 and 13 comprises a pair of jaw members 200 pivoted as by cap screws 202 to the depending portion 204 of a slide bar or shaft 206. The jaw members 200 are provided at the lower ends with inturned jaws 208 having complementary recesses 210 for receiving the shank of the foremost screw element at the lower end of the chute 8, the head of the screw being received upon the upper surface of the jaws 208.

The jaw members 200 have the form of bell cranks, the outwardly extending arms 211 engaging depending projections 212 of a bar 214 slidably mounted on a ram or plunger 216. The slide bar or shaft 206 is slidably mounted in a sleeve 218 secured to a tubular housing 220 bolted or otherwise fastened to the arm 222 of a bracket 224 bolted to the plate 122. A brake member or block 226 of friction material is mounted in an opening in the housing 220 and extends through an opening in the sleeve 218 into engagement with the slide bar or shaft 206 and is held frictionally in engagement with the slide bar by spring strips 228 and 230. The spring strip 230 is secured at its upper end to a pin 232 slidably received in an opening in the housing 220 and bears at its lower end against the block 226. The spring strip 228 is superimposed upon the strip 230 and both spring strips are adjustably mounted upon the housing 220 as by the screw 234. It will be evident that the block 226 of friction material resiliently pressed against the surface of the slide bar 206, acts to hold the slide against movement under the action of gravity and retains the slide bar in every operated position against inadvertent movement.

The ram or plunger 216 is slidably mounted in a sleeve 236 in turn slidably mounted in the slide bar or shaft 206, the sleeve 236 projecting below the shoulder 238 of the slide bar and being provided at its lower end with an annular shoulder 240 adapted to engage the shoulder 238 to limit the up movement of the sleeve 236 relative to the slide bar 206. The bar 214 is yieldably and resiliently associated with the slide bar 206 by springs 242 interposed between the shoulder 238 of the slide bar and the upper surface of the bar 214.

The ram or plunger 216 is adjustably secured to the sleeve 236 as by external threads 244 formed at the upper end of the plunger and engaging the internal threads 246 at the upper end of the sleeve. A clamping nut 248 retains the plunger in adjusted position relative to the sleeve 236.

The drive attachment 16 for connecting the assembly mechanism to the ram 22 of the punch press machine preferably comprises a cup-shaped member or sleeve 250 closed at its lower end and adjustably secured to the sleeve 236, the sleeve 236 passing through an enlarged opening in the closed end of the sleeve 250 and being adjustably secured thereto as by opposed pairs of adjusting and clamping nuts 252 positioned to engage opposite surfaces of this bottom portion of the sleeve 250. The sleeve 250 is slidably received in the centrally bored lower end portion of the ram 22, but is normally locked against sliding movement relative to the ram 22 by a pin 254 slidably mounted in a transverse opening in the ram 22 and receivable within a transverse opening 256 in the sleeve 250. The pin 254 is secured to or formed integrally with the armature of a solenoid 258 secured to a plate 260 fastened in any convenient manner to the lower end of the ram 22. The pin 254 is normally urged into the locking position shown in Fig. 6 by a coil spring 262 embracing the pin 254 and interposed between a collar 264 secured to the pin and the frame of the solenoid in which the pin is slidably mounted at one end.

The screw receiving jaw members 200 are normally held in closed position under the action of the springs 242 pressing against the bar 214 which engages the jaw members outwardly of their pivots 202 and therefore normally urges these jaw members toward each other to a closed screw receiving position. Movement of the jaw members oppositely to each other and into an open position is effected by a pair of adjustable set screws 266 (as shown in Fig. 12), the screws 266 being threaded into the laterally bent end portions 268 of fixed bars 270 secured in any convenient manner to the tubular housing 220. Clamp nuts 272 retain the set screws 266 in adjusted position.

In operation, the ram or plunger 216 and the sleeve 236 have a limited movement downwardly relative to the slide bar or shaft 206 and this limited relative movement is determined by a pair of adjusting and clamping nuts 274 threaded on the sleeve 236 beneath the lower pair of adjusting and clamping nuts 252 and in a position to engage the upper end of the slide bar 206 when this limited downward relative movement has been accomplished.

The assembly mechanism hereinbefore described cooperates with the washer feed mechanism to provide as articles of commerce the preassembled threaded fasteners and lock washers forming the subject matter of applicant's Patent No. 2,150,126, issued March 7, 1939. To facilitate the clear understanding of the present invention, such preassembled fastener units are illustrated herein in Figs. 14 and 15. As shown in these figures, the screw 276, of which the screw head 278 forms a part, has a threaded shank portion 280, the threads of which terminate a certain distance below the head 278 to provide a lock washer retaining section 282 between the head and the thread of the screw. The lock washer may be of any desired conventional structure, preferably of the type having an annular body 284 of spring stock having the prongs 286 which are so twisted, warped or deflected as to present oppositely disposed work engaging edges which project beyond the annular wall of the body 284. The lock washer retaining section 282 includes a plurality of lock washer engaging protuberances 288 extending axially of the retaining section, formed integrally with said section, and spaced angularly about the periphery thereof. The diameter of the central aperture in the lock washer is slightly less than the maximum diameter of the screw shank taken across the protuberances 288, but the diameter of this lock washer aperture is slightly greater than the external diameter of the threaded portion of the screw shank. Thus in assembling the lock washer with the screw, the shank of the screw having been inserted through the central aperture of the lock washer, the wall defining the lock washer aperture shears or swedges its way along the protuberances 288. To facilitate this shearing or swedging, the side walls of each protuberance converge toward their lower edges, and their lower edges are tapered as shown in Fig. 14. The tapered lower edges of the protuberances act also to facilitate the centering of the washer on the retaining section of the screw shank. As shown in these figures, particularly Fig. 15, the protuberances 288 bite into the aperture defining wall of the lock washer and frictionally retain the washer in permanently assembled relation beneath the screw head.

A modified preassembled fastener and washer unit is illustrated in Fig. 17. As shown in this figure, a lock washer is received upon a smooth retaining section 290 formed between the threaded portion of the shank 292 and the head 294 of a screw 296 and is retained on the section 290 by an annular ring or lip 298 swedged from the lower edge of the section 290 so that the annular portion 298 is of an external diameter greater than the diameter of the central aperture of the lock washer. The retaining lip 298 is preferably formed by a hardened steel, generally cresent-shaped annulus 300 set into and lying flush with the upper surface of the ring 120 and the arcuate bar 194 at the point of assembly as shown in Figs. 16 and 17. The edges of the opening 302 of the annulus 300 are aligned with the edges of the guide chute formed by the circumferentially relieved surface of the ring 120 and the bar 194. It will be evident that a screw having been inserted in a washer positioned upon the annulus 300, the application of a downward force to the head of a screw will cause an extrusion of the metal at the lower edge of the retaining section 290 so as to form the annular washer retaining lip 298.

The annulus 300 may also be used in forming the preassembled units of Figs. 14–15, and the lower edges of the ribs 288 therefore swedged outwardly to form an annular rib additionally or alternatively preventing axial movement of the washer on the screw shank.

The solenoid 258 which controls the locking pin 254 is controlled by a washer sensing device 304 so that the assembly mechanism will not be operated by the ram 22 if the washer feeding means fails to deliver a washer to the point of assembly. Whenever the pin 254 is withdrawn from the opening 256, the ram 22 moves idly up and down along the sleeve 250 without effecting an actuation of this sleeve. The washer sensing device 304 comprises a resilient strip 306 having a bent end portion 308 engaging with a washer positioned in a recess 130 of the washer feed disc 128 at the point of assembly, and adapted to move inwardly of the recess as shown in Fig. 10 if such recess does not contain a washer at the point of assembly. Upon inward movement of the resilient strip 306 from the position shown in Fig. 9 to the position shown in Fig. 10, the resilient strip moves a shiftable contact member 310 into engagement with a fixed contact member 312, the contact members 310 and 312 being connected in series with the solenoid 258 and a source of electrical supply not shown, so that upon closing of the contact members, the solenoid 258 will be energized.

*Operation of the assembly mechanism*

The operation of the assembly mechanism is substantially as follows: Upon upward movement of the ram 22 of the punch press the ram or plunger 216, the sleeve 236, and the slide bar 206 with the jaw members 200 carried by said bar are brought to the position illustrated in Fig. 13, in which position the upper surface of the jaws 208 lie in the plane or just below the plane of the upper edges of the guide bars 104 and 106 of the guiding and feeding chute 8. In this position the jaw members are closed, the ram or plunger 216 at its lower edge is spaced slightly above the head of the screw, the annular shoulder 240 of the sleeve 236 engages the shoulder 238 of the slide bar 206 and the lower nut of the clamping and adjusting nuts 274 is spaced slightly above the upper end of the slide bar 206. The foremost screw at the lower end of the guide chute 8 gravitates or slide onto the jaws 208 with the shank of the screw being received in the openings 210 in these jaws. Upon downward movement of the ram 22, the ram or plunger 216 and the sleeve 236 are moved downwardly a limited distance relative to the slide bar 206 so that the plunger contacts the head of the screw and the clamping and adjusting nuts 274 engage the upper edge of this slide bar 206. Upon continued downward movement of the ram 22, the slide bar 206 is moved downwardly in unison with the plunger 216 and the sleeve 236 to carry the screw downwardly and to insert the shank thereof through the aperture in the washer. As the ram or plunger 216, the sleeve 236, and the slide bar 206 approach their lower limit of movement, the set screws 266 engage the arms 211 of the jaw members 200, thereby rotating these jaw members oppositely to screw-releasing position against the force of the springs 242 while the ram or plunger 216 completes its downward movement to ram or press the protuberances 288 of the retaining section 282 of the screw into the material of the lock washer, and the head of the screw down upon the lock washer, or in respect to the modification shown in Fig. 17, to ram or press the retaining section 290 upon the die block 300, thereby forming the annular retaining lip 298.

*Operation of the machine*

The operation of the machine will be apparent from the foregoing detailed description of the construction and operation of the several parts thereof. It may, however, be generally noted that screws are fed by the intermittently operated band 48 through the upper end of the chute 8 whence they gravitate in succession toward the assembly mechanism 16. Washers dumped or massed within the hopper formed by the feed disc 128 and the shell 132 are fed in succession from the mass at the rear of the shell by the intermittently operated disc 128 and by said disc are brought in succession to a position in the plane of the path of movement of the jaw members 200 of the assembly mechanism and for a definite time interval are retained in said position, lying also in the plane of the path of movement of the screws down the chute 8. The screws are successively picked up by the jaw members 200 of the assembly mechanism and are carried downwardly by these members and inserted into the washer at the assembly point and a partial insertion of a screw having been effected, the jaw members are moved oppositely to release a screw, following which the ram or plunger 216 continues its downward movement to ram or press the screw into final assembled relation with the washer, which in its final assembled position is located just below the head of the screw. From the assembly point the feed disc 128 moves the assembled units in succession along the guide chute formed by the circumferentially relieved surface of the ring 120 and the arcuate bar 194 until the screw becomes aligned with the discharge chute 14 and the shank of the screw is received between the spaced bars 196 and 198 of the chute. Thereafter as the disc 128 moves, the assembled units are withdrawn from the disc by the bar 196 which, engaging the shank of the screw element, in effect moves the screw element radially with respect to the disc so as to remove the washer from the recess 130 of the disc.

Operation of the assembly mechanism and the feeding of a screw thereby to the disc 128 is prevented if the disc fails to carry a washer to the point of assembly as previously described. If for any reason a screw is not delivered to the assembly mechanism, the washer which may at that instant be positioned at the point of assembly is not extracted from the disc, but remains in its recess 130 during the next revolution of the disc and is returned to the point of assembly.

Changes may be made in the form, construction and arrangement of the parts without departing from the spirit of the invention or sacrificing any of its attendant advantages, and the right is hereby reserved to make all such changes as fairly fall within the scope of the following claims.

I claim:

1. Washer feeding means comprising a hopper having an annular wall for confining a mass of washers to be fed, an inclined rotatable disc confined within said annular wall of the hopper and having outwardly opening, peripheral recesses for receiving and carrying washers from the mass, said wall having a relieved portion extending upwardly from above the lowest point of the disc to permit discharge of the washers from the recesses, said recesses being constructed and arranged to each select upon rotation of the disc a single washer from a mass in the lower part of the hopper at the lowest point of the disc, said disc being rotated in a direction to carry the selected washer upwardly from the mass and then to the relieved wall portion of the hopper for discharge from the disc by outward radial movement relative to the disc.

2. Washer feeding means comprising a hopper having an annular wall for confining a mass of washers to be fed, an inclined rotary disc within said hopper and positioned for rotation beneath the mass of washers, said disc having a plurality of angularly spaced outwardly opening peripheral recesses each for selecting a single washer from the mass, said annular wall having an opening therethrough to a lower portion of the inclined disc, an inclined track extending through the opening to the periphery of the disc for successive registration with the peripheral recesses to receive the washers discharged from said recesses of the disc by outward movement edgewise of the disc.

3. Washer feeding means comprising a hopper receiving a random heap of washers, a bottom wall portion of the hopper being formed by a rotatable disc having recesses extending inwardly from its edge and below its upper surface to receive individual washers in the plane of the disc surface from said heap and convey said washers individually to a discharge point, and a stationary side wall circumscribing said disc and upstanding from the plane thereof to confine said heap of washers, said side wall being relieved at the discharge point to permit discharge of the washers by outward radial movement relative to the disc.

4. Washer feeding means comprising a washer hopper having a bottom wall portion formed by an inclined rotary disc and a side wall portion having an opening therein uncovering a portion of the peripheral edge of the disc, said inclined rotary disc having angularly spaced recesses opening outwardly and extending inwardly from the periphery of the disc and receiving washers from a mass in the hopper to carry them to a discharge point within the area of said opening for release by movement outwardly in the plane of the disc.

5. Washer feeding means comprising a hopper having an annular wall for confining a mass of washers to be fed, an annular, stationary shoulder projecting inwardly from said wall, a rotary washer feed disc within said hopper and having its rim portion overlying the inner edge of said shoulder and having outwardly opening peripheral slots therein, each arranged to select an individual washer from the mass and carry it along said shoulder to a discharge point, said wall being relieved at the discharge point to permit discharge of the washers from the slots of the disc by outward radial movement relative to the disc.

6. Washer feeding means comprising a hopper having an annular wall for confining a mass of washers to be fed, an inclined flat disc rotatable within said wall, said disc having a plurality of radial slots therethrough opening outwardly of the peripheral edge of the disc for selecting a single washer from the mass and carrying the selected washer to a point of discharge, said annular wall having a relieved portion at the discharge point through which the washers are discharged by outward movement edgewise of the disc.

CARL G. OLSON.